(12) United States Patent
Jung

(10) Patent No.: US 8,423,513 B2
(45) Date of Patent: Apr. 16, 2013

(54) FILE GENERATION AND SEARCH METHODS FOR DATA SEARCH, AND DATABASE MANAGEMENT SYSTEM FOR DATA FILE SEARCH

(76) Inventor: Jong Sun Jung, Goyang-si (KR)

( * ) Notice: Subject to any disclaimer, the term of this patent is extended or adjusted under 35 U.S.C. 154(b) by 22 days.

(21) Appl. No.: 13/003,649

(22) PCT Filed: Jul. 10, 2009

(86) PCT No.: PCT/KR2009/003790
§ 371 (c)(1),
(2), (4) Date: Mar. 21, 2011

(87) PCT Pub. No.: WO2010/005261
PCT Pub. Date: Jan. 14, 2010

(65) Prior Publication Data
US 2011/0246505 A1    Oct. 6, 2011

(30) Foreign Application Priority Data
Jul. 11, 2008  (KR) .......... 10-2008-0067778

(51) Int. Cl.
*G06F 17/00*  (2006.01)
(52) U.S. Cl.
USPC .......................... 707/661; 726/27

(58) Field of Classification Search .......... 707/705–720, 707/654–668, 795–796; 726/26–30
See application file for complete search history.

(56) References Cited

U.S. PATENT DOCUMENTS

| | | | |
|---|---|---|---|
| 6,243,330 B1 * | 6/2001 | Oshima ........................ | 380/228 |
| 7,289,723 B2 * | 10/2007 | Kikuchi et al. ............... | 386/248 |
| 7,792,986 B2 * | 9/2010 | Donoho et al. .............. | 709/236 |
| 7,814,554 B1 * | 10/2010 | Ragner .......................... | 726/27 |
| 2004/0189827 A1 | 9/2004 | Kim et al. | |
| 2007/0271253 A1 | 11/2007 | Lebrat | |

FOREIGN PATENT DOCUMENTS

| | | |
|---|---|---|
| KR | 10-2001-0010528 | 2/2001 |
| KR | 10-2001-0094691 | 11/2001 |
| KR | 10-2004-0079470 | 9/2004 |
| WO | WO 2005-101292 | 10/2005 |

* cited by examiner

*Primary Examiner* — Wilson Lee
(74) *Attorney, Agent, or Firm* — Sherr & Jiang, PLLC

(57) ABSTRACT

A method for creating/storing a file that facilitates search of data stored in a storage medium, and a data search method using the same are disclosed. The file creating method creates a rack of virtual RAM (RAM) file that is divided into several units according to divisional units for individual divisional units, and a record allocation table (RAT) file that stores a record position of each divisional unit of the RVR file. As a result, a database (DB) of large-volume irregular data can be easily created, and data analysis can be quickly achieved.

12 Claims, 17 Drawing Sheets

FIG. 3

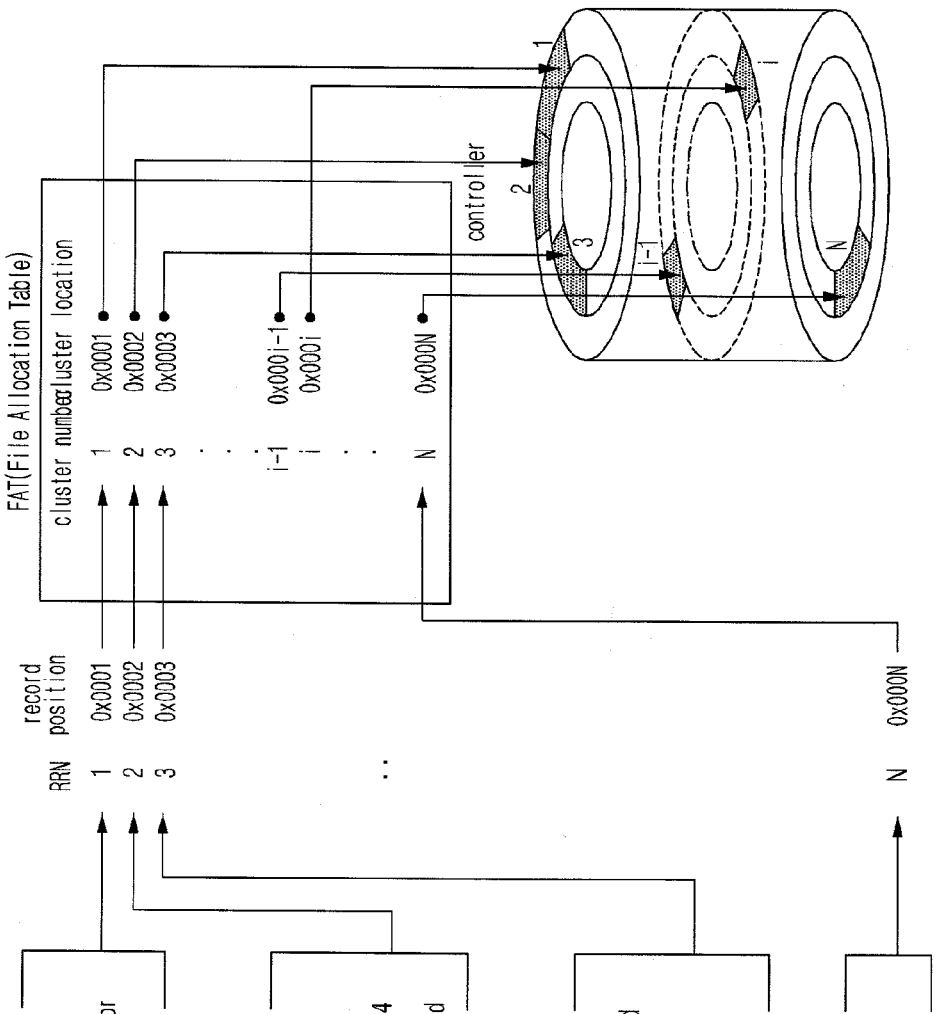

Hardware Area

>PubMed 1
Tumors of the optic chiasm aor relatively uncommon and usually associated with phakomatoses such as neurofibromatosis. Even more rare is the presentation of a primary, non-exophytic, isolated optic chiasm germ cell tumor (GCT). These tumors have imaging characteristics nearly indistinguishable from optic chiasmatic gliomas(OCGs)

>PubMed 2
To test whether oral L-81 treatment could improve the condition of mice with diabetes and to inverstigate how L-81 regulates microsomal triglyceride transfer protein (MTP) activity in the liver. METHODS:Genetically diabetic(db/db) mice were fed on chow sullpemented with or without L-81 for 4 wk. The body weight, plasma glucose level, plasma lipid profile, and adipocyte volume of the db.db mice were assessed after treatment. Toxicity of L-81 was also evaluated.

>PubMed 3
Inuremic patients on hemodialysis, a first vascular access using native vessels tailored into a radiocephalic arteriovenous fistula(AVF) on the wrist is the gold standard in vascular access quality. However, among the uremic population the percentage of older patients affected by diabetes or by severe generalized vascular disease is growing. In these patients distal radiocephalic AVFs often have a limited survival. This induced us to design >PubMed i
>PubMed N
...

FIG. 5 page divisionnal factor

>PubMed 1
Tumors of the optic chiasm are relatively uncommon and usually associated with phakomatoses such as neurofibromatosis. Even more rare is the presentation of a primary, non-exophytic, isolated optic chiasm germ cell tumor (GCT). These tumors have imaging characteristics nearly indistinguishable from optic chiasmatic gliomas (OCGs).

line divisionnal factor

>PubMed 2
To test whether oral L-81 treatment could improve the condition of mice with diabetes and to investigate how L-81 regulates microsomal triglyceride transfer protein (MTP) activity in the liver. METHODS: Genetically diabetic (db/db) mice were fed on chow supplemented with or without L-81 for 4 wk. The body weight, plasma glucose level, plasma lipid profile, and adipocyte volume of the db/db mice were assessed after treatment. Toxicity of L-81 was also evaluated.

₩n
₩n
₩n
₩n
₩n
₩n
₩n
₩n
₩n

>PubMed 3
In uremic patients on hemodialysis, a first vascular access using native vessels tailored into a radiocephalic arteriovenous fistula (AVF) on the wrist is the gold standard in vascular access quality. However, among the uremic population the percentage of older patients affected by diabetes or by severe generalized vascular disease is growing. In these patients distal radiocephalic AVFs often have a limited survival. This induced us to design >PubMed i —— word divisionnal factor (white space, tab, comma, etc.)
...

>PubMed N
...

X : limited only by DRAM size
Y : no limit

FIG. 7

< string format >

| 1 | 504 | SO4 | 1g3b | 2252 | 1g3hA | b47.12 |
| 2 | 379 | MSE | 1765A | 1082 | 1765A | b50.11 |
| 3 | 255 | MG | 1ouk | 5221 | 1ouk | b144.1.7 |
| 4 | 246 | GOL | ser2E | 4790 | ser2E | b50b12 |

< int format >

| 2 | 504 | 1345 | 32 | 11 | 666 | 678 |
| 1 | 379 | 1343 | 23 | 22 | 444 | 789 |
| 3 | 255 | 2456 | 27 | 21 | 184 | 344 |
| 6 | 246 | 1890 | 22 | 32 | 234 | 294 |

< float format >

| 1.1234 | 504.0 | 2.3456 | 1.1120 |
| 2.3453 | 379.1 | 1.3434 | 2.2322 |
| 3.2345 | 255.2 | 0.3425 | 2.2345 |
| 4.2342 | 246.3 | 2.4534 | 3.3453 |

FIG. 8

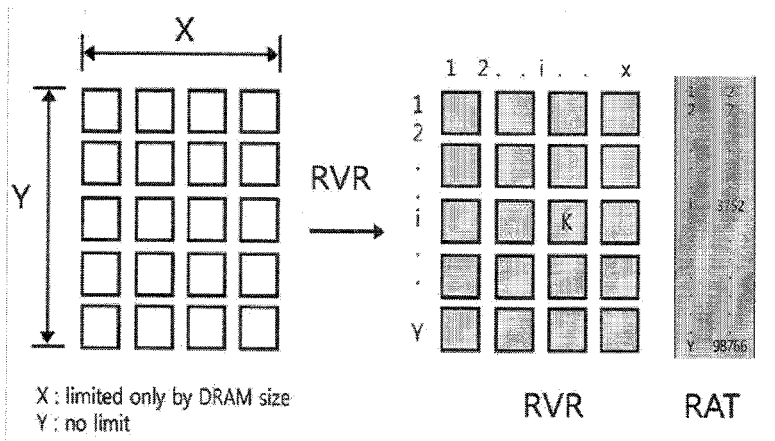

X : limited only by DRAM size
Y : no limit

RVR    RAT

FIG. 9

```
- Pseudo-program
    RVR -w [function][input_file][RVR-RAT]  // making a RVR-RAT file
    RVR -r [RVR-RAT][Query]                 // random access of query // definition of arguments
    -W: write a RVR-RAT file
    -R: read a RVR-RAT file and display a query record
    function: line, page, word, string, int and float
    Query(=k): Relative record number (RRN)

- Pseudo-codes
    // writing a RVR-RAT file
    BIGIN
      READ(data_record);       // read records
      INITIALIZATION(bytes_of_record); // initialization of array
      sum_bytes = 0;           // initialization of variable
      bytes_of_record[1] =0;   // first record address = "0"
      FOR i=2 TO n DO
        bytes=FWRITE(RVR_FILE, data_record[i-1]); //writing a RVR_FILE
        sum_bytes = sum_bytes+bytes;      // accumulating bytes of records
        bytes_of_record[i] = sum_bytes;   // applying equations (1),(2)or(3)
      END FOR
      FWRITE(RAT_FILE, bytes_of_record);  // writing a RAT_FILE
    END BIGIN // random access of a RVR-RAT file
    BIGIN
      INPUT query;    // reading a query
      k = query;      // query
      READ(RAT_FILE, bytes_of_record);       // reading a RAT_FILE
      FSEEK(RVR_FILE, bytes_of_record[k]);   // searching a record address
      FREAD(RVR_FILE, data_record[k]);       // reading a record
      DISPLAY(data_record[k]);               // printing a record
    END BIGIN
```

FIG. 17
Addition
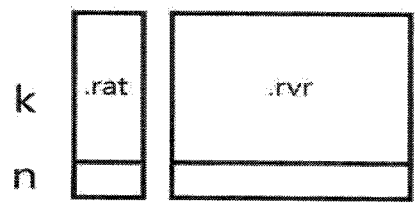
Deletion
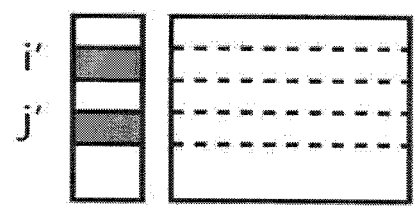
Update
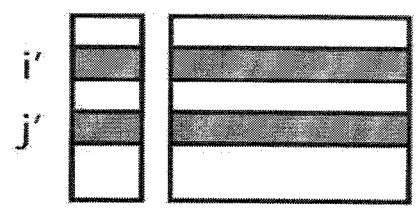
Search
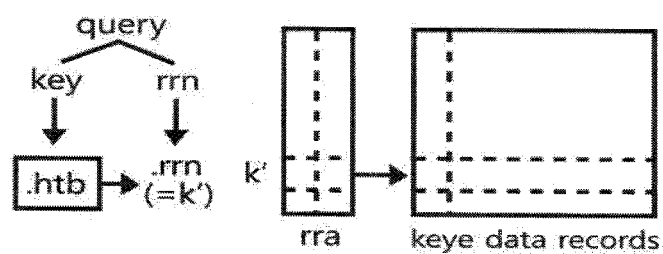

FILE GENERATION AND SEARCH METHODS FOR DATA SEARCH, AND DATABASE MANAGEMENT SYSTEM FOR DATA FILE SEARCH

CROSS REFERENCE TO PRIOR APPLICATIONS

This application is a National Stage Patent Application of PCT International Patent Application No. PCT/KR2009/003790 (filed on Jul. 10, 2009) under 35 U.S.C. 371, which claims priority to Korean Patent Application No. 10-2008-0067778 (filed on Jul. 11, 2008), which are both hereby incorporated by reference in their entirety.

BACKGROUND OF THE INVENTION

1. Field of the Invention

The present invention relates to a method for creating and storing a file that enables easier searching and a method for searching for data using the same.

2. Description of the Related Art

FIG. 1 is a conceptual diagram illustrating data stored in a general hard disk. The hard disk constructs a cylinder composed of a plurality of tracts constructing an original plate, and performs input/output (I/O) operations through a Read/Write header connected to a boom of each tract. In FIG. 1, it is assumed that the smallest data unit (i.e., record) is stored in each of the $1^{st}, 2^{nd}, 3^{rd}, 4^{th}, \ldots, i\text{-}1^{th}, i^{th}$, and $N^{th}$ sectors. The term 'cluster' means a set of neighboring sectors. A file manager may arrange a cluster and a physical position using a File Allocation Table (FAT).

In the FAT system, records are sequentially arranged in a plurality of clusters. In order to search for record information of an i-th sector located in an intermediate stage, the FAT system sequentially processes tracks from a first sector to the i-th sector, and finally arrives at the i-th sector, such that it can search for records contained in the first to i-th sectors.

On the other hand, when using a Random Access Memory (RAM), in order to quickly extract necessary information from files including either variables or variable names, it is necessary for all variables to be processed by a Dynamic Random Access Memory (DRAM) in a programming process, such that the RAM can immediately search for a position in which the corresponding variable name is stored. As a result, necessary information can be quickly found in RAM.

However, as DRAM capacity increases, the price of a DRAM serving as a semiconductor material rapidly increases as compared to a hard disk, resulting in a reduction of the cost efficiency of large amount of data that requires more than 128 Gigabytes. Therefore, in order to store large amounts of data, hard disks have been more widely used than DRAMs throughout the world.

Therefore, disc formats of the conventional art have the following disadvantages.

In other words, when using a sequential access method in the same manner as in a disc to search through large amounts of stored data, the access speed geometrically varies with the size of data as compared to a random access speed of a data record.

In addition, provided that the conventional art pre-calculates random access addresses (highly integrated indexes) of all data records and does not store the calculated addresses in external storage, the access speed geometrically changes with the data size.

Specifically, in recent times, with the increasing development of biotechnology, large amounts of dielectric clinical genetic function—related data such as genomics or omics data (large capacity biological information) has been accumulated, and researchers can extract useful information through calculation using the resultant data. The size of each irregular data (each irregular data) is about several to tens of terabytes, and it is expected that the size of each irregular data is about pentabytes during the execution of a greater project. In this case, a speed difference in data access time between the sequential access method and the random access method based on the highly integrated index technology may be several days to several years, such that the conventional art will be incapable of implementing data access or data search.

SUMMARY OF THE INVENTION

Accordingly, the present invention is directed to a method for creating a file for data search, a method for searching for a data file, and a database management system for searching for the data file, that substantially obviate one or more problems due to limitations and disadvantages of the related art.

It is an object of the present invention to provide a method for constructing a Record Allocation Table (RAT) for a variety of records of all constituent units (i.e., page, paragraph, line, word, string, integer, and float) of a large amount of data, performing random access of position information (i.e., address) on a hard disk, implementing a database management system (DBMS) for large volumes of irregular data, and allowing a hard disk to search for data as quickly as in a DRAM.

It is another object of the present invention to provide a method for analyzing and calculating large volumes of data, allowing a huge amount of data not to be processed in a DRAM (DRAMs of more than 128 gigabytes are very expensive, resulting in a reduction in practical use), and controlling the huge amount of data to be processed in a hard disk at a speed similar to a DRAM access speed.

It is yet another object of the present invention to provide a data processing method for quickly and effectively searching a large file, thereby facilitating intensive research into clustering of large amounts of data.

In accordance with the present invention, the above and other objects can be accomplished by the provision of a file creation method for searching for a single irregular data file, the method including: (A1) receiving a divisional unit of data as an input; (A2) discriminating the single irregular data file using the received divisional unit, and creating a rack of virtual RAM (RVR) file; (A3) detecting a record position for each divisional unit of the RVR file, and creating a record allocation table (RAT) file; and (A4) storing the RVR file and the RAT file.

The data may be regular data, and the divisional unit may be any one of [page], [paragraph], [line] and [word].

In accordance with another aspect of the present invention, a file creation method for searching for a single regular data file includes: (B1) discriminating between a row and a column of one regular data, and creating a rack of virtual RAM (RVR) file; (B2) detecting a record position for each row or column of the RVR file, and creating a record allocation table (RAT) file; and (B3) storing the RVR file and the RAT file.

The record position may be the size of data accumulated in the single data extended up to a specific position where corresponding data is recorded.

The record position may be a number of a hard disk cluster in which data of a corresponding part is recorded.

In accordance with another aspect of the present invention, a method for searching for a single data file includes: (C1) receiving search information; (C2) detecting a record position contained in single data corresponding to searched information from a record allocation table (RAT) file; (C3) detecting a physical storage position contained in a storage medium of data corresponding to the searched information from the record position; and (C4) searching for data of a physical position of the data, and outputting the searched result.

If the single data is irregular data, the searched information may be an order of each divisional unit.

If the single data is regular data, the searched information may be a number of a row or column of corresponding data from among the regular data.

The record position may be the size of data accumulated in the single data extended up to a specific position where corresponding data is recorded.

The detecting step (C3) of the storage position may include calculating a cluster position from the record position using a size of data of each divisional unit, reading a physical storage position of the cluster position from a file allocation table (FAT), and detecting the read physical storage position of the cluster position.

The record position may be a number of a hard disk cluster in which data of a corresponding part is recorded.

In accordance with another aspect of the present invention, a system for managing a database (DB) to search for a data file includes: a database (DB) for storing a rack of virtual RAM (RVR) file created by discriminating a single input irregular data file using a predetermined divisional unit, and a record allocation table (RAT) file created by detecting a record position for each divisional unit of the RVR file; a rack of virtual RAM (RVR) controller for detecting a record position of searched information from the RAT file in association with input searched information, detecting a physical storage position contained in a storage medium of data corresponding to the searched information from the record position, searching for data of the physical position, and reading the searched data; and an analysis module for analyzing a result read by the RVR controller.

The divisional unit may be any one of [pagen], [page], [fastan], [fasta], [line], [image], [audio] and [video].

The searched information may be an order of each divisional unit.

The record position may be the size of data accumulated in the single data extended up to a specific position where corresponding data is recorded.

The record position may be a number of a hard disk cluster in which data of a corresponding part is recorded.

The storage medium may be a semiconductor storage medium.

In accordance with another aspect of the present invention, a system for managing a database (DB) to search for a data file includes: a database (DB) for storing a rack of virtual RAM (RVR) file created by discriminating a single input data file using a regular divisional unit based on a row and column, and a record allocation table (RAT) file created by detecting a record position for each divisional unit of the RVR file; a rack of virtual RAM (RVR) controller for detecting a record position of searched information from the RAT file in association with input searched information, detecting a physical storage position contained in a storage medium of data corresponding to the searched information from the record position, searching for data of the physical position, and reading the searched data; and an analysis module for analyzing a result read by the RVR controller.

The divisional unit of the regular data may be any one of [seq], [int], [float], [string], [csv], [r], [xml] and [smtx].

The searched information may be a row number or a column number of corresponding data from among the regular data.

The record position may be the size of data accumulated in the single data extended up to a specific position where corresponding data is recorded.

The detecting of the storage position may include calculating a cluster position from the record position using a size of data of each divisional unit, reading a physical storage position of the cluster position from a file allocation table (FAT), and detecting the read physical storage position of the cluster position.

The record position may be a number of a hard disk cluster in which data of a corresponding part is recorded.

In accordance with another aspect of the present invention, a method for searching for a data file includes: (D1) fragmenting a genome base sequence into predetermined-sized base units; (D2) allocating a unique number to each fragmented base unit; (D3) storing a storage position of each base unit; and (D4) creating a record allocation table (RAT) file.

The unique number in the step (D2) may be a tetramal number classified according to bases constructing the base unit.

In accordance with another aspect of the present invention, a method for searching for a data file, the method includes: (E1) assigning a serial number to input data according to a divisional unit; (E2) calculating a serial number of data that includes a word contained in the input data; (E3) creating a hash table including the word and the serial number; and (E4) creating a record allocation table (RAT) using the hash table.

BRIEF DESCRIPTION OF THE DRAWINGS

The above and other objects, features and other advantages of the present invention will be more clearly understood from the following detailed description taken in conjunction with the accompanying drawings, in which:

FIG. 3 exemplarily shows the relationship among an RVR file, a RAT file, and data stored in a disc according to the embodiments of the present invention.

FIGS. 5 and 6 show examples for creating a RAT file and an RVR file from a data file when stored data of the present invention is a general document.

FIGS. 7 and 8 show examples for creating a RAT file and an RVR file from a data file when stored data of the present invention is a matrix.

FIG. 9 exemplarily shows a program and source code for performing record and access functions of RVR and RAT files according to the embodiments of the present invention.

FIG. 17 exemplarily shows a method for adding, deleting, updating, and searching for data by an RVR DBMS according to the present invention.

DETAILED DESCRIPTION OF THE INVENTION

Figure 1:
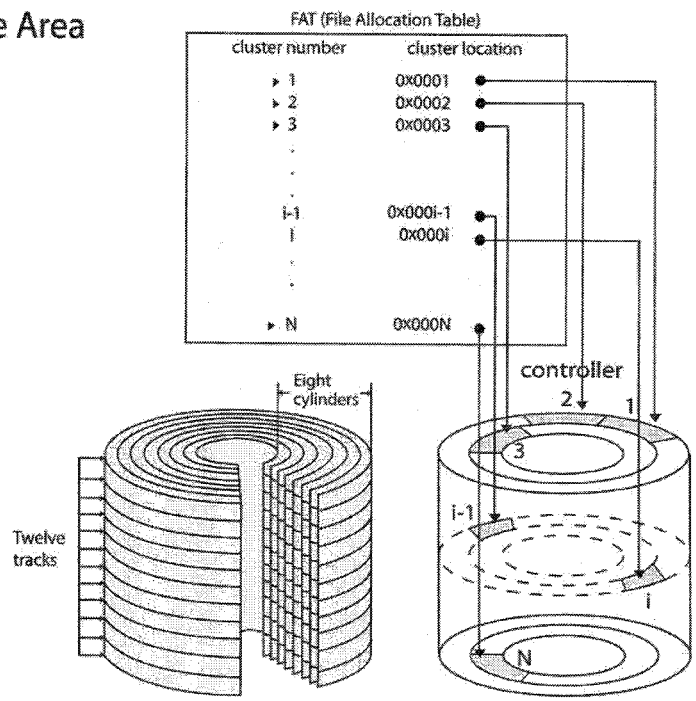
FIG. 1 is a conceptual diagram illustrating data stored in a general hard disk.

Reference will now be made in detail to the preferred embodiments of the present invention, examples of which are illustrated in the accompanying drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear. Exemplary embodiments of the present invention provide a method for recording data in a disc and a method for searching for data in a disc.

Figure 2:
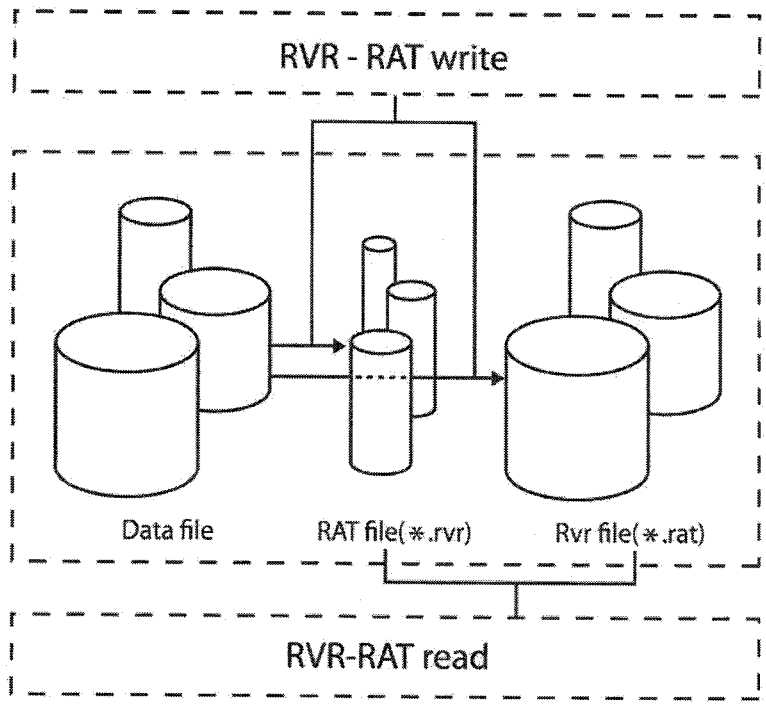
FIG. 2 exemplarily shows the relationship among a data file, a RAT file, and an RVR file according to the embodiments of the present invention.
Figure 4:
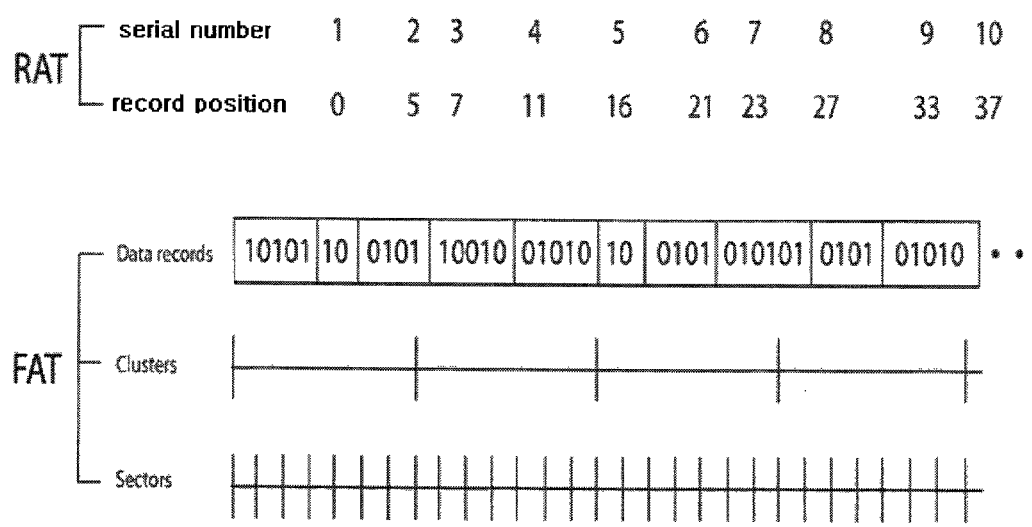
FIG. 4 exemplarily shows the relationship between a data file and a RAT file according to the embodiments of the present invention.

FIG. 2 exemplarily shows the relationship among a data file, a Record Allocation Table (RAT) file, and a Rack of Virtual RAM (RVR) file according to the embodiments of the present invention. FIG. 3 exemplarily shows the relationship among an RVR file, a RAT file, and data stored in a disc according to the embodiments of the present invention. FIG. 4 exemplarily shows the relationship between a data file and a RAT file according to the embodiments of the present invention.

Referring to FIGS. 2 to 4, data according to the present invention is stored as an RVR file format, and a RAT file acting as a dynamic table of the RVR record is generated and stored.

In other words, if a user attempts to store an arbitrary data file, a data file is converted into an RVR file, and a RAT file is generated, such that the RVR file and the RAT file are stored in a hard disk.

In this case, the RVR file is generated by including a divisional factor in a data file. In addition, the divisional factor is adapted to discriminate data for each divisional unit serving as a recording unit of data. The divisional unit may be established in various ways, for example, [paragraph], [line], [word], [string], [integer], or [float], etc.

Type and function of the divisional factor (divisional unit) will hereinafter be described with reference to a method for creating the RVR file and the RAT file.

The RAT file stores a dynamic table that indicates the position of each recording unit, and indicates the position of specific data in the RVR file during the data searching operation.

Referring to FIG. 3, it is assumed that the smallest data unit of a hard disk serving as a data storage unit is stored in each of first, second, third, fourth, . . . $i-1^{th}$, $i^{th}$, and $N^{th}$ sectors. A cluster is a set of sectors, and is used as a record unit of data.

A file manager serving as a file management program arranges a cluster and a physical position according to a File Allocation Table (FAT), such that it can store a file.

However, a plurality of clusters may be required to store one file, and the clusters are not allocated in regular order. In other words, the file manager searches for a recordable cluster and stores a file corresponding to the searched cluster. The order of clusters used for recording the file is recorded in the FAT. While the file is reproduced (searched), the order of clusters is read and data can be read, such that the file can be reproduced or searched.

That is, as shown in FIGS. 2 to 4, individual physical cluster positions are stored according to a series of cluster numbers.

Meanwhile, the RAT file for the above data is a data file distinguished by a divisional factor for each divisional unit. FIG. 3 shows an exemplary text divided into line units. In accordance with the embodiment of the present invention, stored data of the present invention is a general document.

The created RAT file stores a serial number (line number in FIG. 3) for indicating the order of divisional factors and a record position (i.e., address) where data corresponding to the serial number is recorded.

In this case, the address serving as the record position may be represented by the size of accumulated data.

That is, the address serving as the record position can be represented by the following equation 1.

$$\text{address}[k]=(i-1)*\text{bytes\_of\_record} \quad \text{[Equation 1]}$$

In this case, assuming that all records use the same number of bytes, 'bytes_of_record' is a constant decided according to hard disk characteristics.

Therefore, provided that the record position is divided by the constant (bytes_of_record), the cluster number ('i') can be recognized, such that the record position of physical data can be recognized through FAT.

Meanwhile, provided that stored data of the present invention is configured in the form of a matrix (table) and all records (record units) of the matrix use the same number of bytes, a record address of a specific position (k) on the matrix is obtained by the partitioning of Equation 1.

The partitioning result of Equation 1 can be represented by the following equation 2.

$$\text{address}[k]=[x-1]*\text{bytes\_of\_record}+[y-1] \\ *\text{bytes\_of\_record}*N \quad \text{[Equation 2]}$$

In Equation 2, k is a serial number of a matrix record unit, and N is the number of divisional factors on an X axis.

Provided that bytes of respective records are different from one another, the following equation 3 can be obtained.

$$\text{address}[k] = \sum_{i=2}^{k} \text{bytes.of.record}[i-1] \quad \text{[Equation 3]}$$

In Equation 3, k is a serial number of a matrix record unit, bytes.of.record[i] indicates bytes of paragraph records, i is a serial number of a specific line or a paragraph record, and address[k=1] is initialized to zero '0'.

Figure 6:
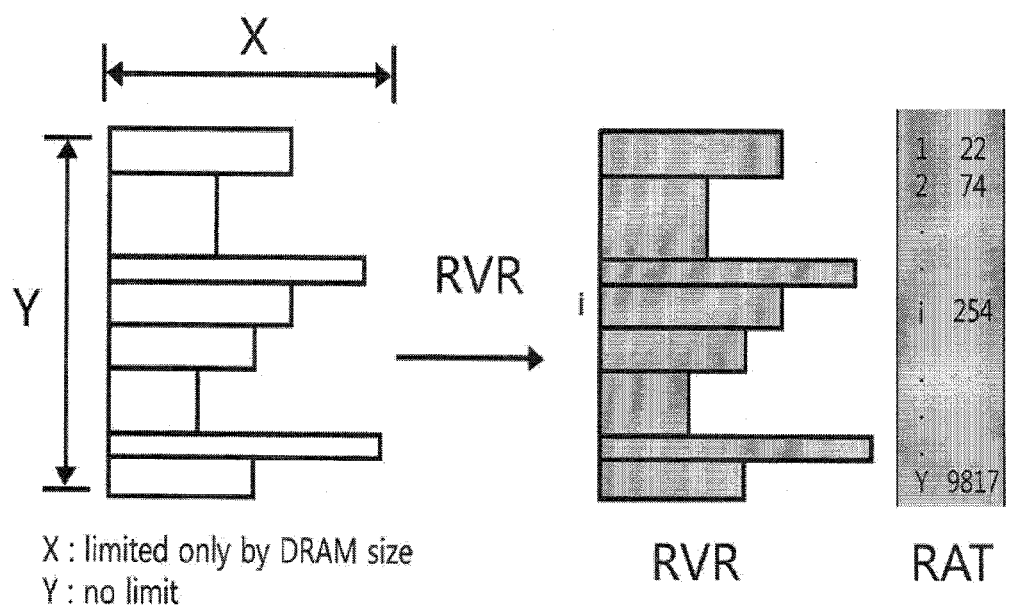

FIG. 5 shows an example for creating an RVR file from a data file when stored data of the present invention is a general document. FIG. 6 shows an example for creating a RAT file from a data file when stored data of the present invention is a matrix-type regular document.

Referring to FIG. 5, if stored data is a general document (data and document have the same meaning), there are a variety of divisional units, for example, [paragraph], [line], [word], etc. As can be seen from FIG. 5, divisional units (i.e., [paragraph], [line], and [word]) are applied to the same document such that the RVR file is created.

In this case, a general document is an irregular document in which the document format is irregular. The irregular document may indicate most documents not written in a regular format instead of a matrix format (e.g., a table). The term 'general document' has the same meaning as that of the term 'irregular document'.

In other words, a first paragraph creates an RVR file using '[paragraph]' as a divisional unit. As shown in the drawing, each paragraph is denoted by a divisional factor '>'.

A second paragraph creates an RVR file using '[line]' as a divisional unit. As shown in the drawing, each line is denoted by a divisional factor '\n'.

A third paragraph creates an RVR file using '[word]' as a divisional unit. As shown in the drawing, each paragraph is denoted by a divisional factor ' '.

The divisional unit of data is decided according to user selection, and may be replaced with an arbitrary symbol.

Meanwhile, as shown in FIG. 6, the RAT file is created from the created RVR file. As described above, the RAT file includes not only a serial number for indicating the order of sequential divisional units of the RVR file but also a record position (address) where the corresponding data is stored.

That is, as shown in FIG. 6, the amount of accumulated data is indicative of a record position.

FIG. 7 shows an example for creating a RAT file and an RVR file from a data file when data of the present invention is stored in matrix format. FIG. 6 shows an example for creating a RAT file and an RVR file from a data file when data of the present invention is stored in matrix format.

Referring to FIG. 7, if data is stored in matrix format, an additional divisional unit and an additional divisional factor are not present. That is, a row and a column of the matrix are a divisional unit and a divisional factor, respectively.

In this case, the matrix-format document is indicative of a regular document. The matrix-format document has the same meaning as that of the regular document.

In this case, a storage format is classified into [string], [integer] and [float] according to data formats stored in each matrix.

FIG. 7 shows an example of an arbitrary RVR file having a storage format such as [string], [integer] or [float].

In this case, 'string' may indicate a storage format in which all kinds of data including character data and numeric data (including a decimal point) can be freely stored in a cell of the matrix.

In addition, 'integer' may indicate a storage format in which data stored in a cell of the matrix is an integer variable.

Also, 'float' may indicate a storage format in which data stored in a cell of the matrix includes a decimal point.

Meanwhile, as shown in FIG. 8, the RAT file is created from the created RVR file. As described above, the RAT file includes not only a serial number indicating a row number of the matrix-type RVR file but also a record position where the corresponding data is stored.

FIG. 9 exemplarily shows a program and source code for performing record and access functions of RVR and RAT files according to the embodiments of the present invention.

In FIG. 9, a program for executing read/write (R/W) operations of the RVR-RAT is an Indexing RVR (IRVR). FIG. 9 shows actual exemplary sequences of a plurality of records of 6 different data (depending upon a divisional unit or a data format) shown in FIGS. 5 and 7.

Values of respective bytes are calculated in different ways according to respective records and categories of computer operating systems (OSs). Specifically, a file can be converted into a binary file by the 'fwrite( )' function of the C/C++ computer language program, such that the size of each record of individual input files returns to the unit of bytes. Therefore, while large data is converted into an RVR file, all data records are converted into values of bytes obtained through the 'fwrite( )' function and all record addresses obtained by Equations 1, 2 and 3, and the converted result is output and stored as a RAT file.

General users other than experts handling high-level system programming are unable to gain access to information about a FAT-Sector (See FIG. 2). Therefore, a controller is used as an intermediate bridge between FAT-sectors. Likewise, general users who use most high-level computer languages (e.g., Perl, Python, Fortran, C/C++, JAVA, etc.) may use an RVR-RAT that includes a record and record address of a file stored in a hard disk in the same manner as in the FAT-Sector controller.

A method for recording data in a disc and a method for searching for data according to the present invention will hereinafter be described with reference to the method for creating RVR/RAT files and the method for searching for data using the same.

Figure 10:
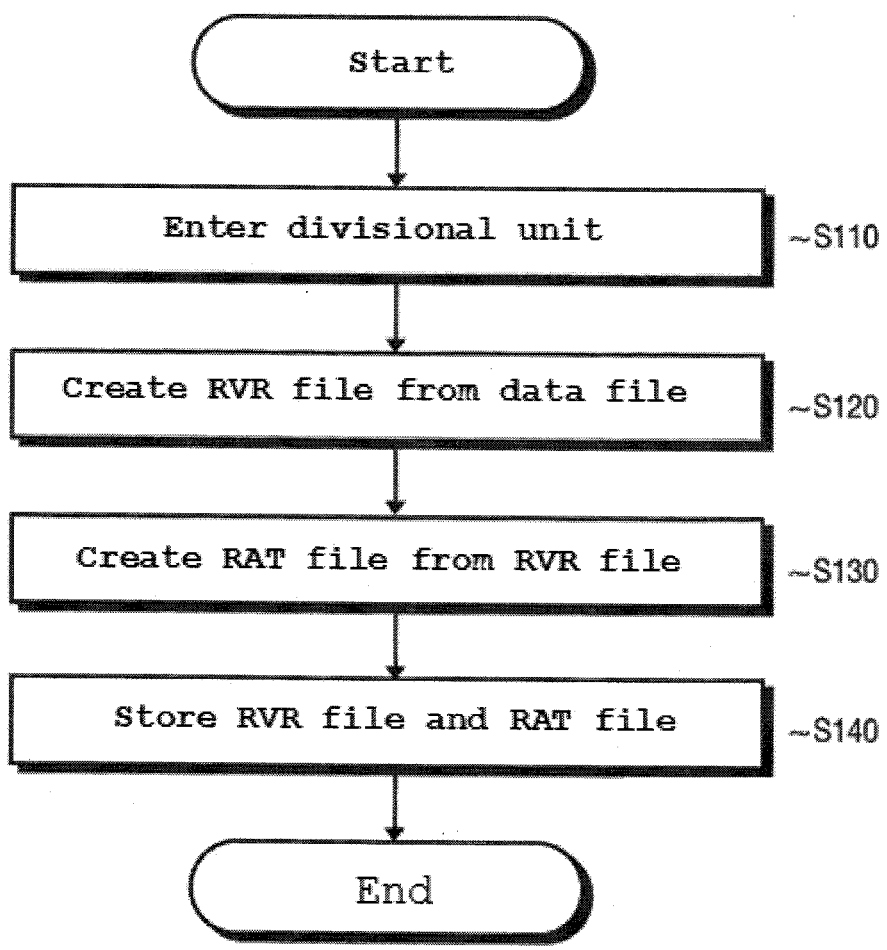
FIG. 10 is a flowchart illustrating a method for creating an RVR file and a RAT file according to the embodiments of the present invention.
Figure 11:
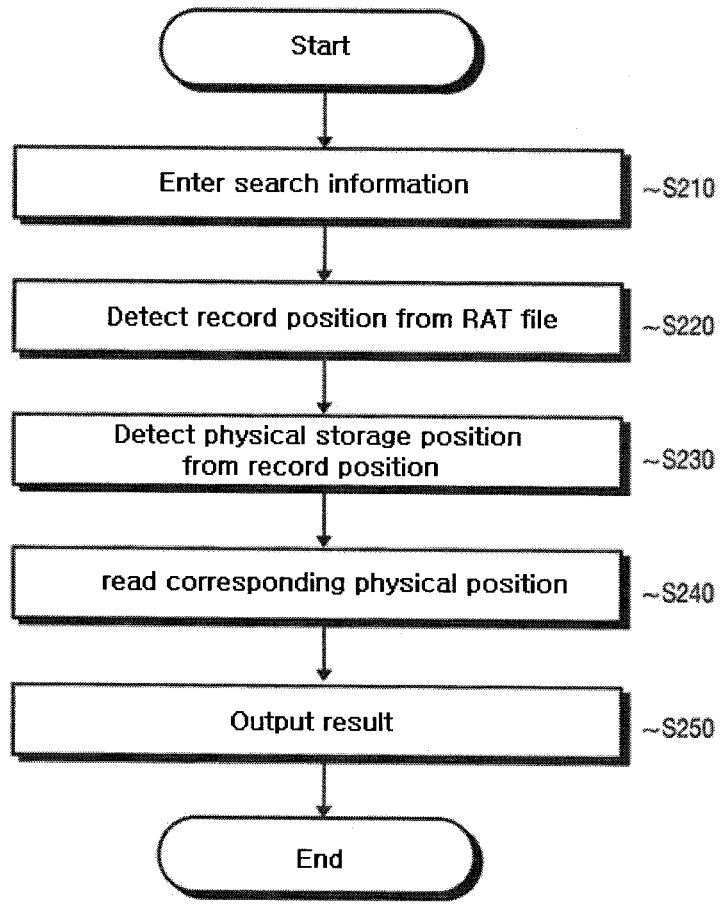
FIG. 11 is a flowchart illustrating a method for searching for data according to the embodiments of the present invention.

FIG. 10 is a flowchart illustrating a method for creating an RVR file and a RAT file according to the embodiments of the present invention. FIG. 11 is flowchart illustrating a method for searching for data according to the embodiments of the present invention.

An exemplary case in which stored data is general document data will hereinafter be described with reference to the annexed drawings.

Referring to FIG. 10, in accordance with a method for creating the RAT file and the RVR file, if a user attempts to store data, the system of the present invention receives information of a divisional unit from the user at step S110.

Thereafter, upon receiving a data file, the system includes a divisional factor corresponding to the divisional unit in the divisional unit information so as to create an RVR file at step S120. Needless to say, the divisional factor does not include a certain function and facilitates creation of the RAT file during a substantial search operation, such that it need not be contained in the RVR file.

In addition, the RAT file is created from the RVR file at step S130. The RAT file discriminates the RVR file using the divisional factor, numbers each serial number, and records a record position of data corresponding to each serial number, such that the RAT file can be created.

Needles to say, the divisional factor may not include a certain function during the substantial search process, and facilitates creation of the RAT file, such that it may not be contained in the RVR file. In this case, the above data is divided by the divisional unit, and at the same time the numbering of the serial number is performed. In addition, the record position of the corresponding data is stored such that the RAT File is created.

In addition, the created RVR and RAT files are stored at step S140.

A method for searching for data using the RAT file according to the present invention will hereinafter be described with reference to the annexed drawings.

Referring to FIG. 11, in order to search for data using the RAT file of the present invention, the system for use in the present invention receives search information form a user at step S210.

The search information may indicate the order of each divisional unit when data is general data. If data is matrix-type data, the search information may indicate a row number of the matrix.

That is, provided that the divisional unit is [paragraph] and the user attempts to search for the N-th paragraph, the search information is denoted by N. Provided that the divisional unit is [line] and the user attempts to search for the N'-th line, the search information is denoted by N'. Provided that the divisional unit is [word] and the user attempts to search for the N"-th word, the search information is denoted by N".

Thereafter, the system of the present invention searches for the stored RAT file and reads a record position corresponding to the search information at step S220.

Next, the system calculates a cluster number from the record position (address), and thus calculates a physical cluster position of data from the FAT at step S230.

In order to calculate the cluster number, Equations 1 to 3 can be utilized as previously stated above.

Thereafter, the system reads the physical data storage position of the hard disk and outputs the read result at step S250.

Next, the sequential data access speed of a general hard disk is compared with the data access speed of the present invention.

Figure 12:
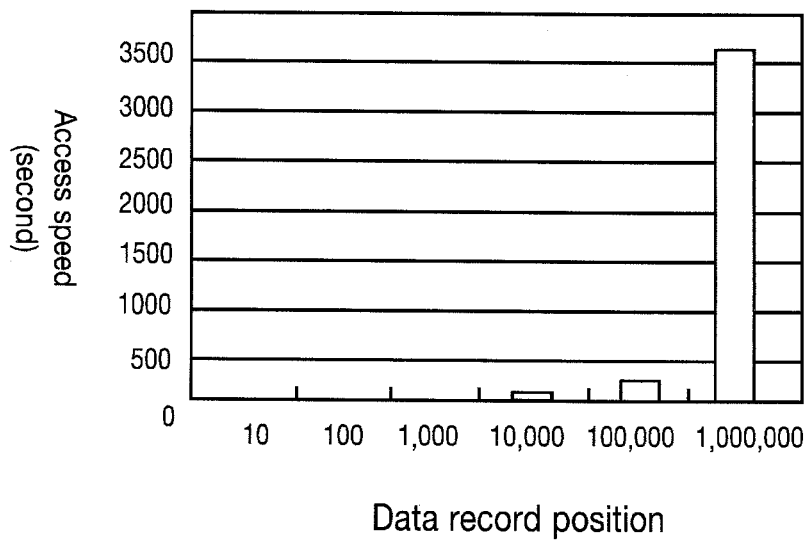
FIGS. 12 and 13 show the result of comparison between a data access speed of the present invention and a sequential data access speed of a general hard disk.
Figure 13:
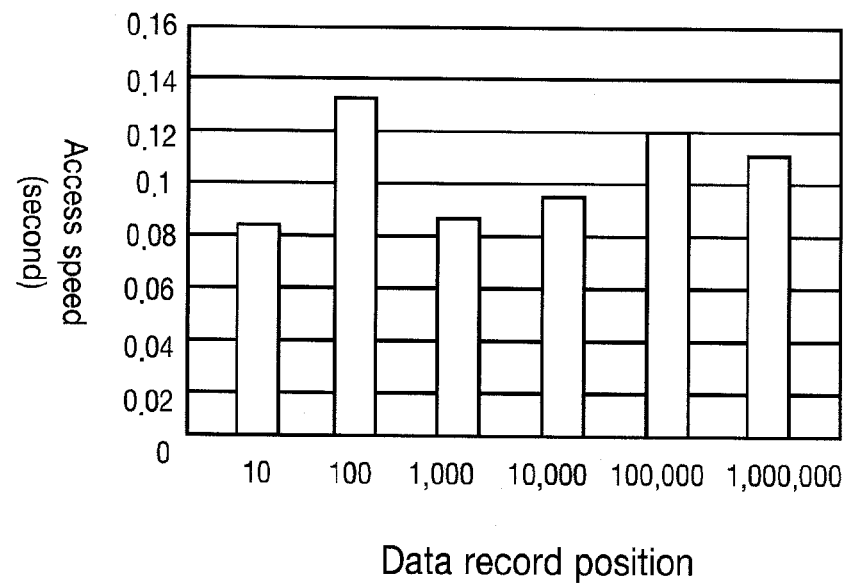

FIGS. 12 and 13 show the result of comparison between a data access speed of the present invention and a sequential data access speed of a general hard disk.

In this case, the search data is one large-scale data of 192 gigabytes having a dimension denoted by '[X:20,000]*[Y:1,000,000]', where X indicates the presence of 20000 variables, each of which includes a decimal point and Y indicates the presence of one million of [X:20000]. In this data, the sequential access time of each $10^{th}$, $100^{th}$, $1000^{th}$, $10000^{th}$, $100000^{th}$, or $1000000^{th}$ record value of the Y value is compared with a random access time using the RVR-RAT.

Under fedora 8.0 Linux environment, the above-mentioned test is carried out by a 64-bit Quadra Core Zeon CPU, and this test is calculated by [IRVR] shown in FIG. 9.

Data located in the frontmost record position has a relatively short access time, and the access speed of more than $1000000^{th}$ data geometrically increases (See FIG. 12).

In contrast, the data access speed of the present invention is maintained at the almost constant time irrespective of the record position, and it can be recognized that the constant time is about 0.1 sec considered to be superior.

Although the method of the present invention requires a considerable time to create the RVR file and the RAT file, the method can very easily search for data after the RVR file and the RAT file are created.

A management system (hereinafter referred to as RVR DBMS) for managing a database (DB) using the above-mentioned file search method will hereinafter be described with reference to the annexed drawings.

Figure 14:
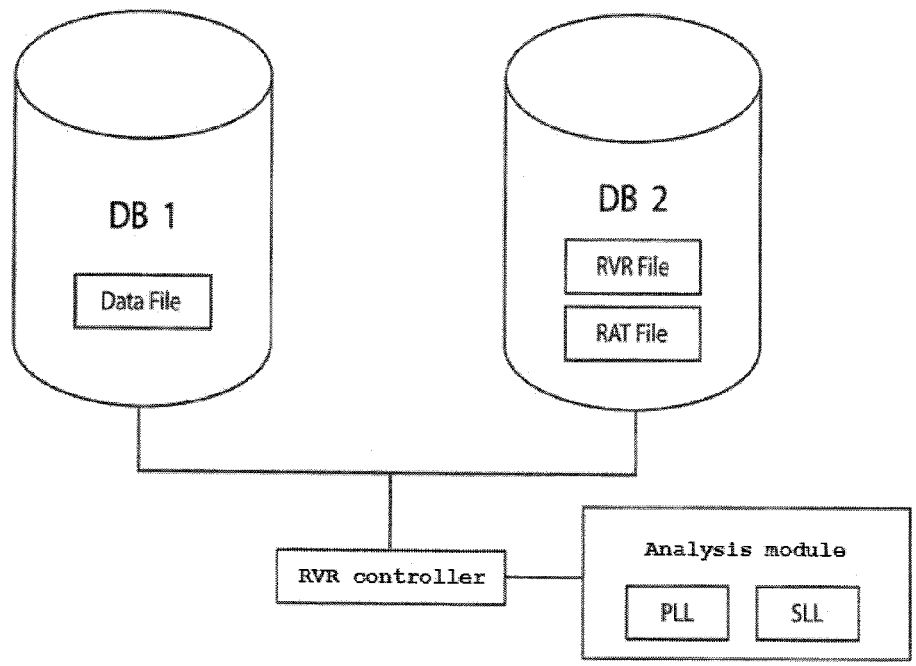
FIG. 14 is a block diagram illustrating an RVR DBMS according to the present invention.
Figure 15:
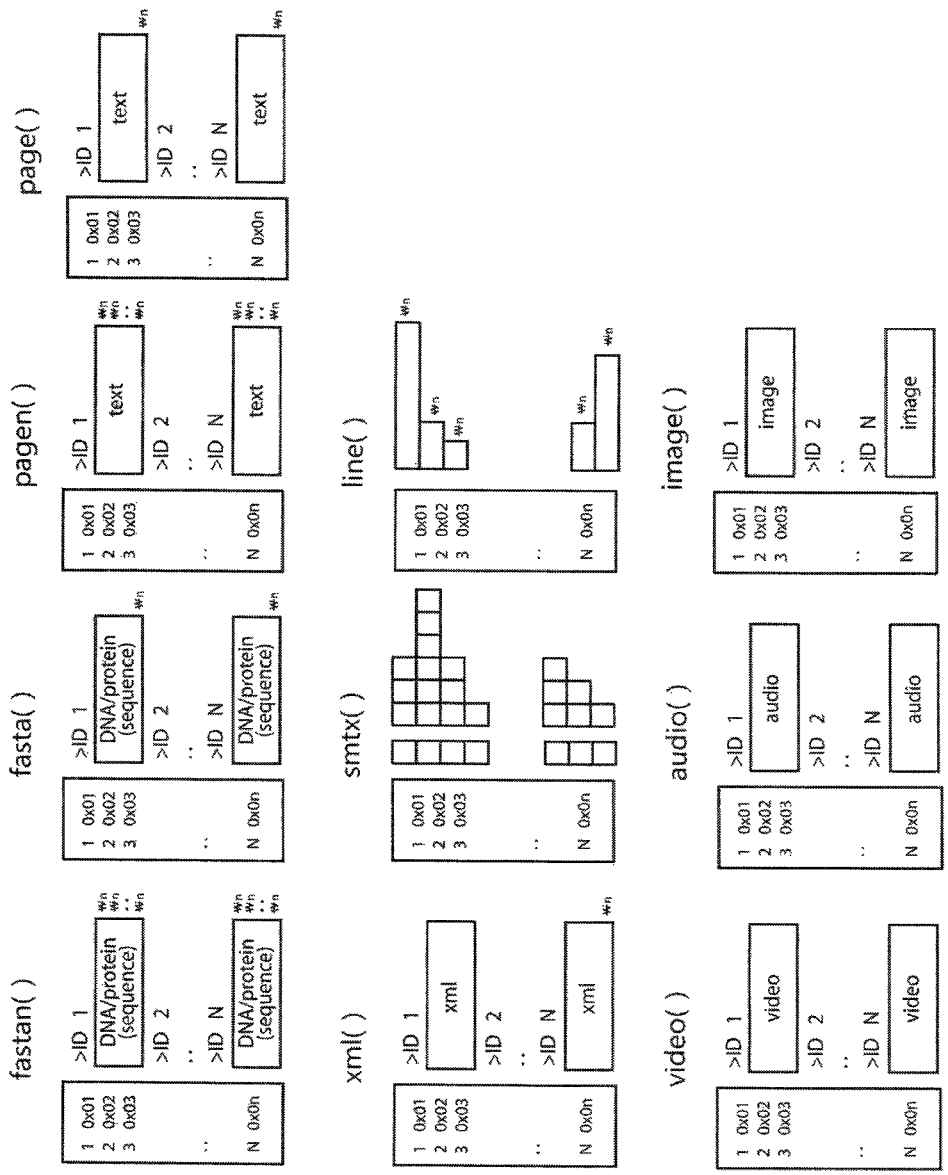
FIG. 15 exemplarily shows divisional units for classifying irregular data by an RVR DBMS according to the present invention.
Figure 16:
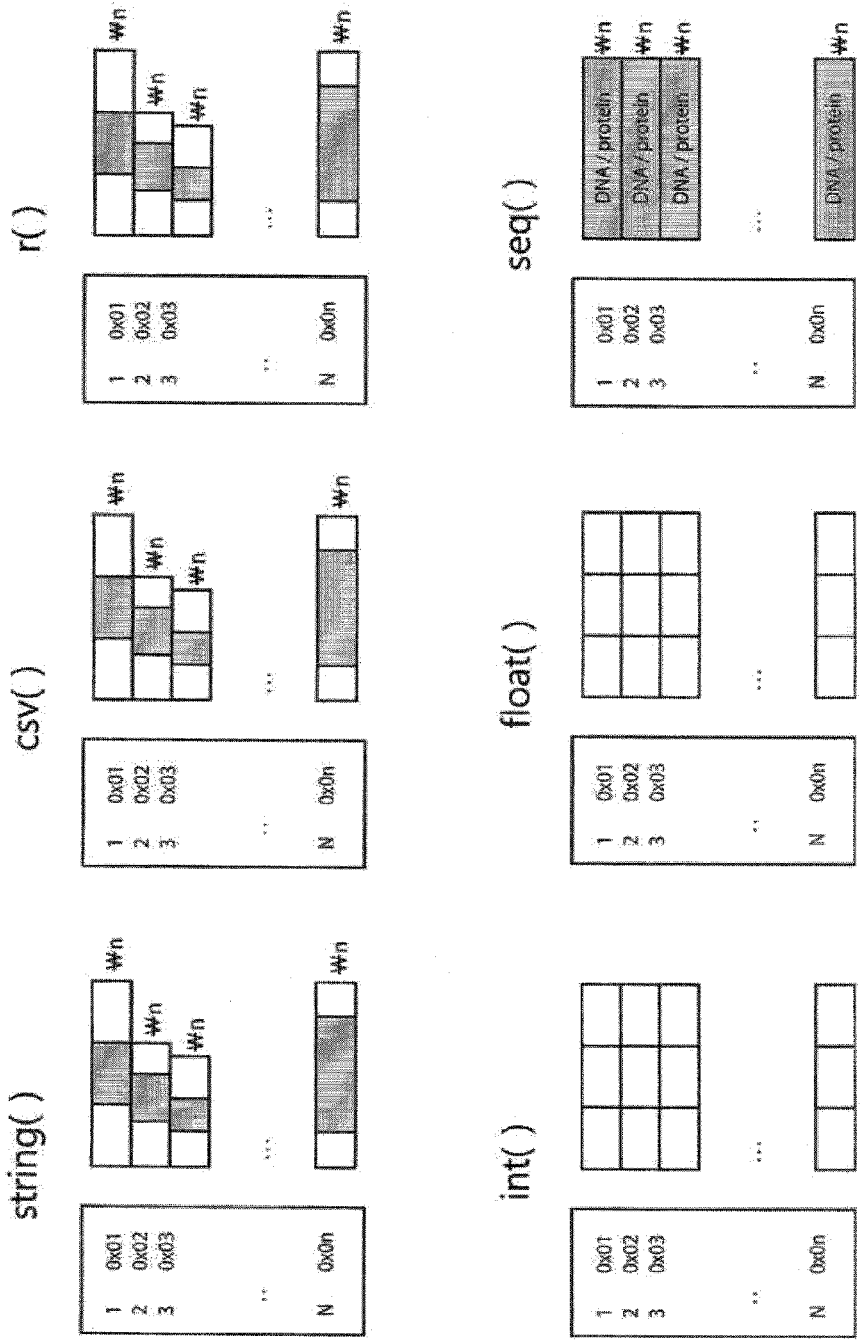
FIG. 16 exemplarily shows divisional units for classifying regular data by an RVR DBMS according to the present invention.

FIG. 14 is a block diagram illustrating an RVR DBMS according to the present invention. FIG. 15 exemplarily shows divisional units for classifying irregular data by an RVR DBMS according to the present invention. FIG. 16 exemplarily shows divisional units for classifying regular data by an RVR DBMS according to the present invention. FIG. 17 exemplarily shows a method for adding, deleting, updating, and searching for data by an RVR DBMS according to the present invention.

The RVR DBMS according to the present invention constructs the data file using a set (i.e., RVR file) of data records and a set (i.e., RAT file) of hard disk highly integrated indexes of the data record set, such that it performs the same data management and analysis operations as those of the standard DB management system using the RVR file and the RAT file.

For this operation, as shown in FIG. 14, the RVR DBMS according to the present invention includes at least one DB, an RVR controller, and an analysis module for analyzing data using stored in the DB.

In this case, the DB stores a data file applied to the RVR DBMS, and also stores the RVR file and the RAT file that are manufactured by the aforementioned processing of the data file. Operations of creating and storing the RVR file and RAT file have already been described in the afore-described best mode for implementing the present invention.

Therefore, the RVR controller creates and stores the RVR file and the RAT file using the data file, and performs a desired analysis operation using the stored RVR and RAT files.

Meanwhile, in order to perform the above-mentioned analysis operation, the analysis module includes a programming language library (PLL) and a statistics language library (SLL).

In this case, PLL is an analysis module composed of various computer programming languages (Java, Perl, Python, C/C++, etc.), and SLL is an analysis module composed of various statistical languages (R, SAS, SPSS, etc.). PLL or SLL is used as an analysis module library that directly receives a pointer of the RVR DB through a pipe and performs analysis and calculation operations on the received pointer. Therefore, PLL or SLL is an analysis library capable of minimizing a time requisite for I/O operations of the analysis system.

Next, a method for recognizing and discriminating data by the RVR DBMS according to the present invention will hereinafter be described in detail. Each data record defined in the RVR DBMS is always matched with the hard disk highly integrated index. Although the above-mentioned hard disk drive (HDD) address has the same physical address as that of a pointer used in C/C++ languages, it has a different method for recognizing/using the physical address. In other words, the pointer of the C/C++ languages indicates a relatively absolute address about a given part irrespective of data records. The hard disk absolute address (i.e., pointer) for use in the RVR DBMS begins with a first data record of a given file and is a relative address of the first data record, and a relative record number (RRN) is given to each of the start and end addresses.

Therefore, the pointer for use in the RVR DBMS indicates only hard disk highly integrated index addresses of individual data records in the set of defined data records.

In addition, the size of a data record may be extended from a single character (=1 byte) to the whole human genome (=3 GB bytes), or the data record may be configured to have various sizes of more than the whole human genome (=3 GB bytes).

Specifically, when using addresses of all individual bases of the genome sequence, a DNA fragment of predetermined size (e.g., 12 oligonucleotides) moves one base by one base such that fragments of the whole chromosome are constructed. The constructed fragments are considered to be A, C, G, and T corresponding to four base sequences, and A, C, G, and T are assigned to the $0^{th}$ order, the $1^{st}$ order, the $2^{nd}$ order, and the $3^{rd}$ order, respectively, and each of the A, C, G and T values is converted into a tetramal number (i.e., is tetramalized) so that a hash table is configured. In addition, if a number is given, the given number may be applied to a specific function that can freely and quickly modified into 12 base sequences.

In the above-mentioned case, if it is assumed that all bases are modified into predetermined-sized records according to the above-mentioned scheme or the similar scheme, the RVR-RAT for records each having 12 base sequences is constructed. In addition, a query base sequence for the data searching can be read through random access in the whole genome related to a plurality of records each including 12 bases.

The embodiment of the base sequences will hereinafter be described in detail.

In addition, when recognizing and representing the data record, tab (comma, white space, line breaker, symbol '>', etc.) may be utilized as necessary. That is, the tab may be defined in different ways according to the user's intention.

Various divisional units for use in the RVR DBMS will hereinafter be described in detail.

The divisional unit may also be extended in various ways other than the best mode of the present invention, and more extended divisional units can be established as follows.

In other words, referring to FIGS. 15 and 13, the RVR DBMS processors can process irregular data and regular data using a variety of divisional units (for example, [1] pagen, [2] page, [3] fastan, [4] fasta, [5] line, [6] image, [7] audio, [8] video, [9] seq, [10] int, [11] float, [12] string, [13] csv, [14] r, [15] xml, and [16] smtx).

In this case, an irregular-type divisional unit (or a non-table type divisional unit) will hereinafter be described in detail.

pagen: Paragraph-type data such as an abstract is modified into a data record, and a line break present in each line is recognized.

page: Although paragraph-type data such as an abstract is modified into a data record, a line break is given only to the end of record.

fastan: Although 'fastan' is equal to 'fasta', 'fastan' is able to recognize a line break in each data record.

fasta: 'fasta' indicates a processor for a specific format in which a line (that includes content such as an ID and description (or annotation) of each record in the same manner as in a page format) including a fasta format related to DNA/protein data begins with '>', does not permit a white space in a base sequence and amino acid sequence, and assigns a line break only to the end of a record.

line: 'line' is a processor that uses a line breaker of each line as a separator and uses data as a data record.

image: 'image' is needed for individual data records of multimedia. 'image' is a processor that converts file formats (gif, jpeg, bmp, pict, pcx, etc.) of various still images into data records.

video 'video' is needed for individual data records of multimedia. 'video' is a processor that converts various moving file formats (mpeg, avi, asf, rm, wmv, etc.) into data records.

audio 'audio' is needed for individual data records of multimedia. 'audio' is a processor that converts various file formats (wav, asf, mp3, ogg, etc.) into data records in the same manner as in data capable of being recognized by person's hearing sense.

Meanwhile, in the case of regular-type data or table-type data, a hard disk drive (HDD) address is stored in units of a table line. Therefore, the address of each data record is calculated by adding a column position value to an address of each line and then adding size information up to the position value to the added result at the corresponding line.

The regular-type data has the following divisional units.

seq: 'seq' is a processor that uses each line of DNA/protein multiple alignment as a data record.

int: 'int' is a regular-type table data format composed of integers.

float: 'float' is a regular-type table data format composed of double precision.

string: 'string' is a regular-type table data format composed of the same-sized or different-sized words.

csv: 'csv' is a value separated by a comma of an Excel file, and indicates a table data format.

r: 'r' is a format about a file, that includes a header and an ID of each line simultaneously while being configured in a 'csv' format.

Specifically, in accordance with the RVR DBMS, such processors ('string', 'csv' and 'r') use the double indexing schema because data records have the same or different sizes. That is, the RVR DBMS stores a map of each line and a map of each record size. However, since 'int' and 'float' have the same sizes in data records, random access of all records are possible on a single map.

xml: 'xml' is used for a format of object-type structured data.

smtx: 'smtx' is a reduction type of a (N×N) matrix. For example, after a part (i.e., a null part), that does not include information of each line, of the (N×N) matrix is completely removed, the number of data records is displayed, if as many records and sub-records as the number of data records are arranged, the size of matrix can be minimized. The processor is able to use such data in the same manner as in the (N×N) matrix.

Indexes of irregular data and regular data will hereinafter be described in detail.

Each index (addressing) used in the RVR DBMS may use a dense index. In other words, a data address is always present in one data record, and a hashing table for a key or an ID about a data record is also used.

In accordance with the RVR DBMS, a regular data record performs dense indexing up to all sub-data records. In relation to irregular data, the dense indexing method is applied to a data record related to irregular data, and the sparse indexing method is applied to sub-records.

FIG. 17 exemplarily shows a method for adding, deleting, updating, and searching for data using an RVR DBMS according to the present invention.

In the case of the RVR DBMS, since the size of data record is not present and only the address of the corresponding position is present, 'addition' is always processed at the end of the entire data record, and 'deletion' is marked in address information.

'insertion' has the same meaning as the addition because the access speed is invariable irrespective of the position of data record.

'update' is performed to delete a data record through deletion, addition, and order-readjustment (e.g., case in which a specific order must be maintained as in 'insertion'), and is also performed for readjustment of data record addresses of a disc.

Hereinafter, a method for generating an RVR file and a RAT file about specific data (genome base sequence and large-scale abstract data) using the RVR DBMS, and searching/analyzing data according to the embodiments of the present invention will hereinafter be described in detail.

A method for processing genome base sequence data according to the embodiments of the present invention will hereinafter be described with reference to FIGS. 18 and 19. A method for processing large-scale abstract data according to the embodiments of the present invention will hereinafter be described with reference to FIGS. 20 and 21.

Figure 18:
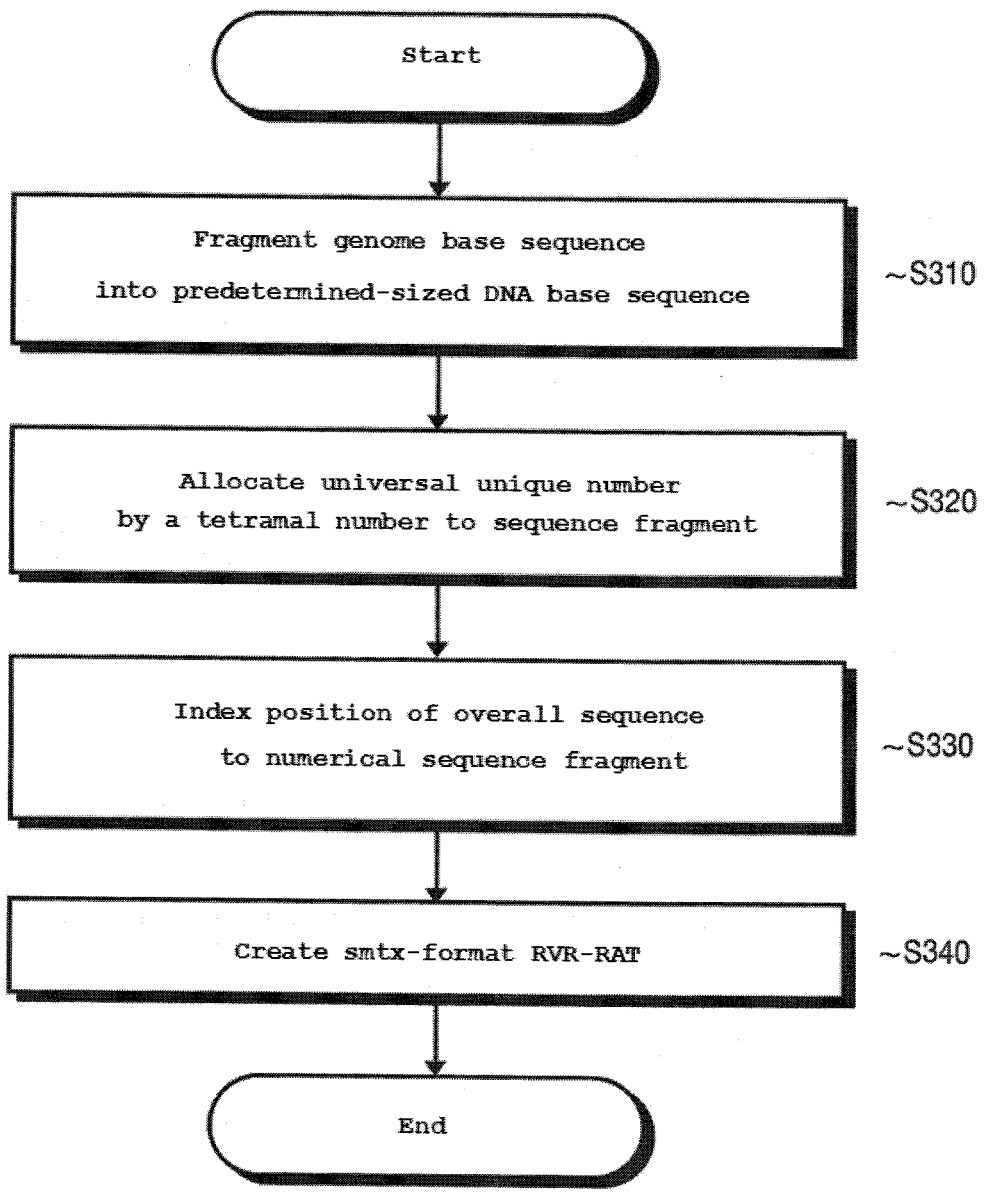
FIG. 18 is a flowchart illustrating a method for creating an RVR file and a RAT file of base sequence data by an RVR DBMS according to the present invention.

FIG. 18 is a flowchart illustrating a method for creating an RVR file and a RAT file of base sequence data by an RVR DBMS according to the present invention. FIG. 19 exemplarily shows a method for creating a RAT file and a RAT file of base sequence data by an RVR DBMS according to the present invention.

Referring to FIG. 18, if input data is genome base sequence data, the genome base sequence is fragmented into a predetermined-sized base unit at step S310. In this case, although the predetermined size may be established in various ways, it is assumed that 12 bases are exemplarily utilized in the embodiment of the present invention as shown in FIG. 19.

Figure 19:
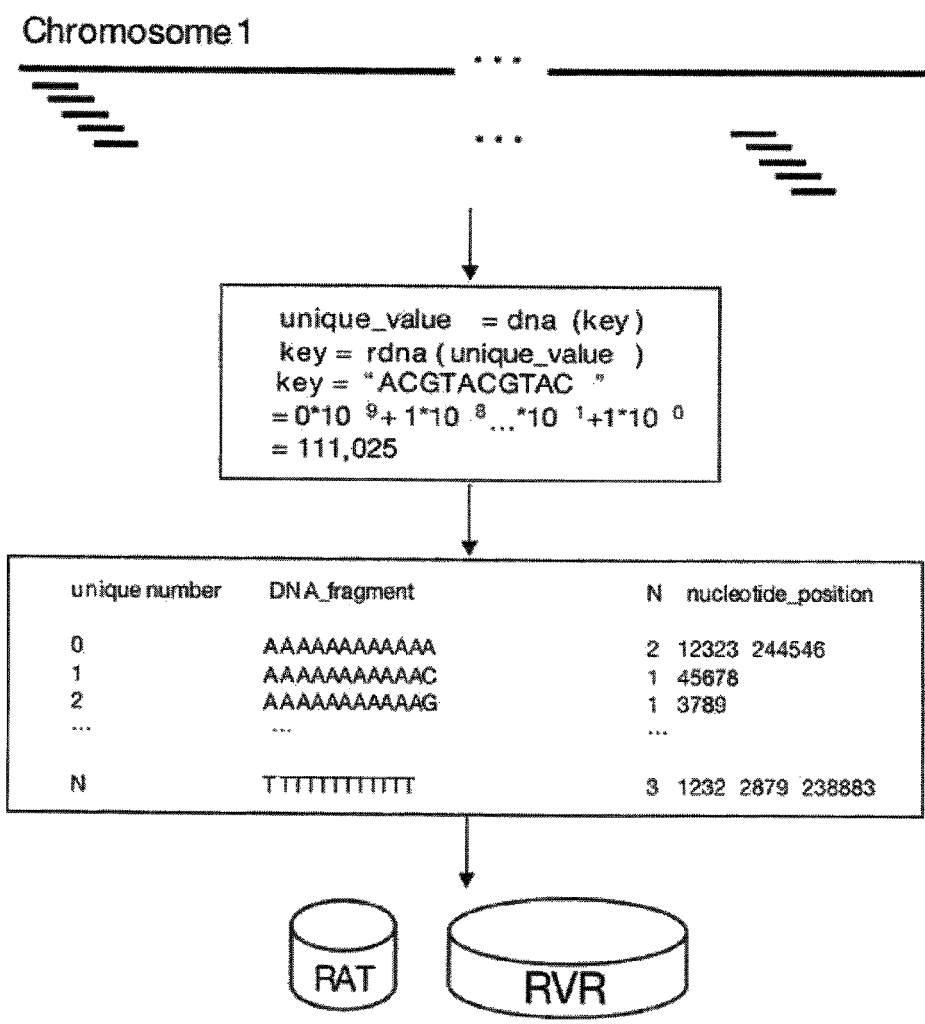
FIG. 19 exemplarily shows a method for creating a RAT file and a RAT file of base sequence data by an RVR DBMS according to the present invention.

That is, as shown in FIG. 19, in association with the entire base sequence, 12 bases from the first base (i.e., an initial base) are discriminated. Then, 12 bases from the second base are discriminated. Until bases from the (the number of all bases—12)$^{th}$ base to the last 12 bases are sequentially discriminated, the discrimination operation is continued.

Next, a unique number is assigned to 7-digit base sequences separated from one another at step S320. In this case, each base of the discriminated base sequence is A, G, T or C, such that a unique number can be effectively assigned using a tetramal number.

In addition, number information including each base sequence to which the unique number is assigned, and each number position is indexed as shown in FIG. 19 (Step S330).

Next, the above-mentioned 'smtx'-type RVR and RAT files are created from the indexed data and the created RVR and RAT files are stored (Step S330).

In this case, the RVR file may correspond to the entire base sequence data. The RAT file stores base data divided into 7 base units, serial numbers added to the 7 base units, and storage position of each base unit.

Meanwhile, if a user attempts to search for data using the RVR and RAT files and inputs a desired base unit (divided into 12 base units) to a query, the RVR DBMS according to the present invention searches for an input base unit in the RAT file, searches for a data position including the base unit, and informs the user of data corresponding to the searched data. Needless to say, if a different analysis command other than the search command is present, the analysis task is performed using the above-mentioned searched result, and the result is applied to the user.

A method for mining data large abstract data using the RVR DBMS according to the embodiment of the present invention will hereinafter be described.

Figure 20:
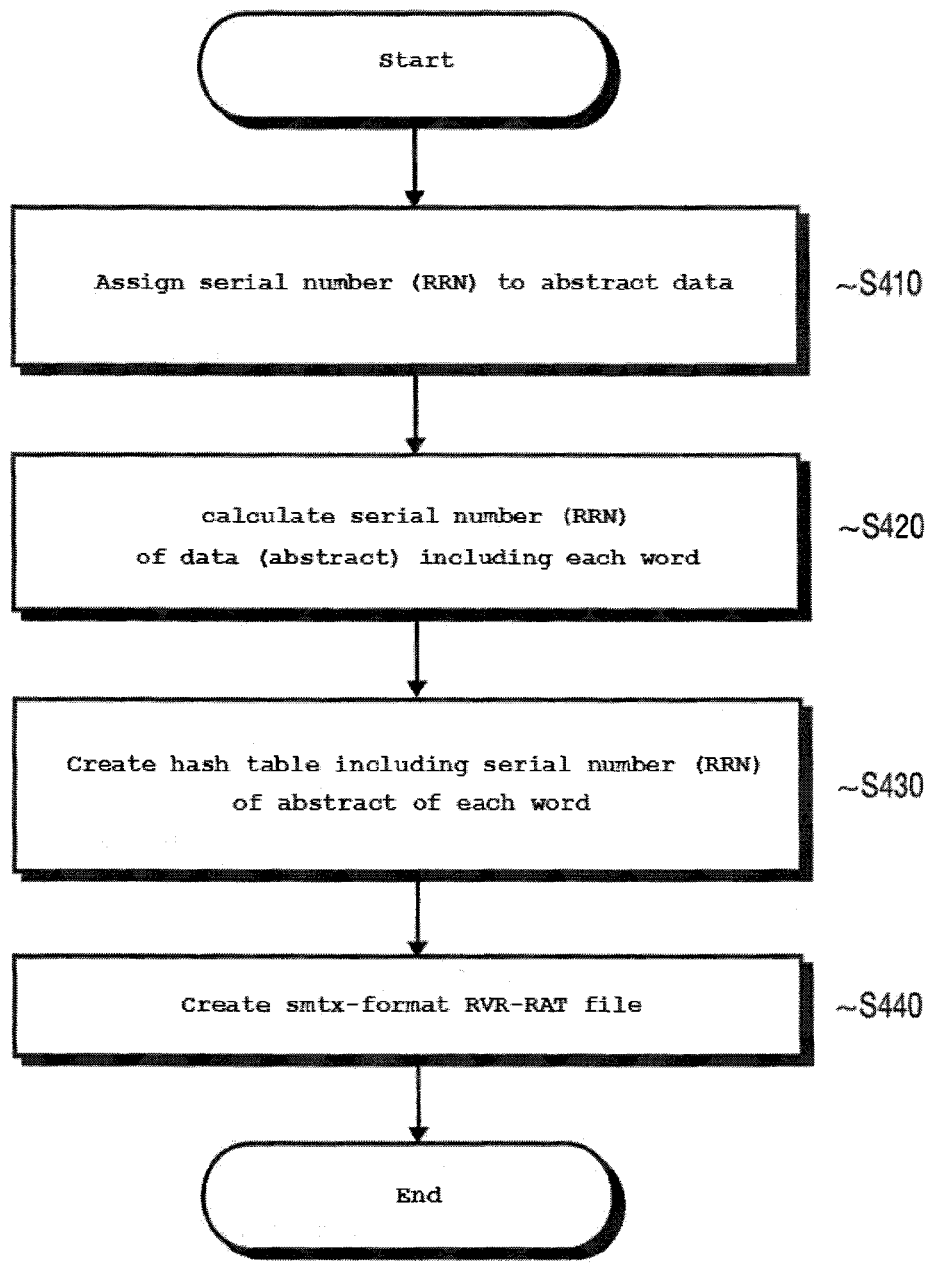
FIG. 20 is a flowchart illustrating a method for creating an RVR file and a RAT file of large-scale abstract data by an RVR DBMS according to the present invention.
Figure 21:
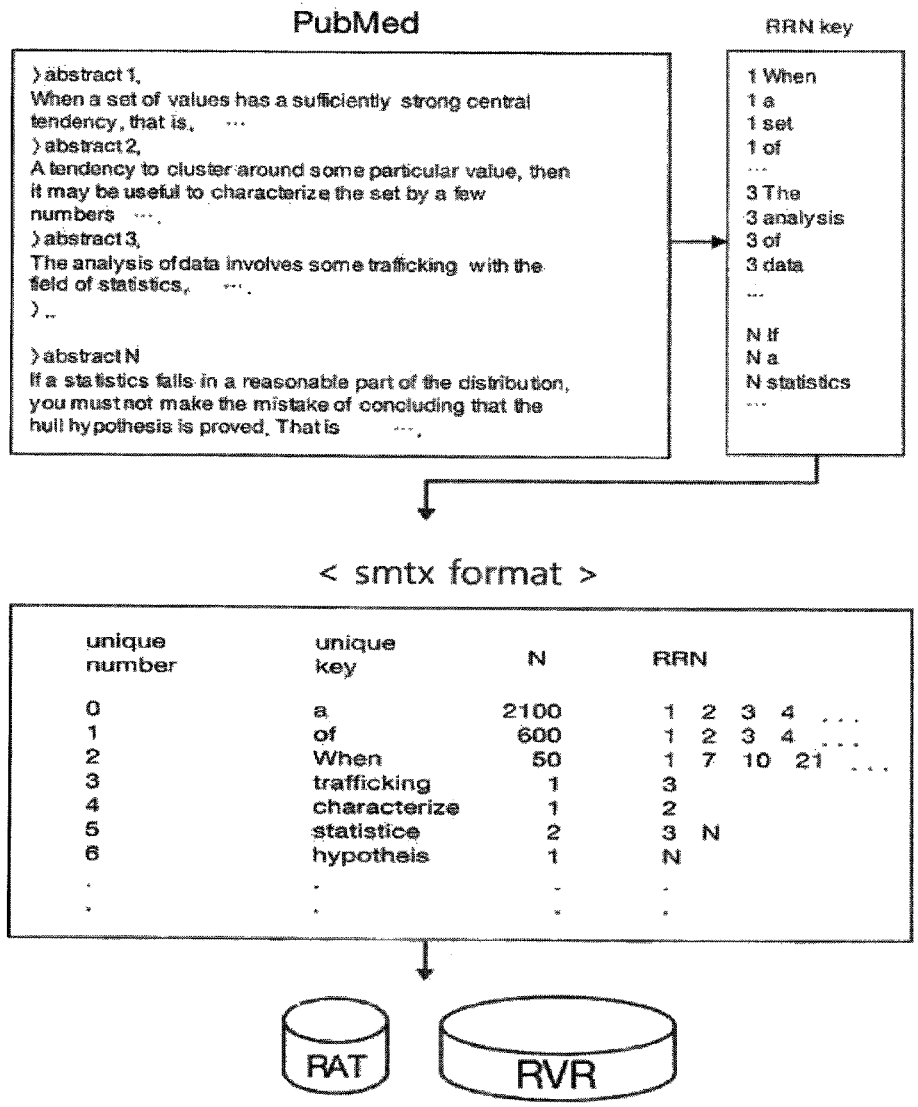
FIG. 21 is a conceptual diagram illustrating a method for creating an RVR file and a RAT file of large-scale abstract data by an RVR DBMS according to the present invention.

FIG. 20 is a flowchart illustrating a method for creating an RVR file and a RAT file of large abstract data by an RVR DBMS according to the present invention. FIG. 21 is a conceptual diagram illustrating a method for creating an RVR file and a RAT file of large-scale abstract data by an RVR DBMS according to the present invention.

In this case, as shown in FIG. 21, large-scale abstract data is composed of a plurality of abstract data such that it constructs large-scale data.

If the input data is large-scale abstract data, a serial number is assigned to each abstract data at step S410.

In relation to words contained in the abstract data, a serial number (RRN) of data including the above word is calculated at step S420.

Thereafter, each word, a serial number assigned to each word, and the number of words are configured in a hash table at step S430.

In this case, although steps S410 to S430 shown in FIG. 20 are performed separately from one another, steps S410 to S430 may be simultaneously performed. The RVR DBMS searches the abstract data from the start part to the end part, calculates serial numbers (RRNs) of initial words, and stores the calculated RRNs. In relation to the overlapped words, number information and a RRN are added to conventional data, such that the overlapped words are created.

Thereafter, 'smtx'-type RVR and RAT files are created from data configured in a table format in step S430 (Step S440).

In this case, the RVR file may correspond to data in which input large-scale abstract data is divided by a serial number (abstract 1, abstract 2, . . . in FIG. 21). The RAT file stores individual words, serial numbers (RRNs) of such words, and the number of stored words.

Meanwhile, the method for searching/analyzing data using the RVR file and the RAT file according to the embodiment of the present invention is performed in the same principle as in the aforementioned base sequence data. However, the RVR DBMS receives each word as a query, and performs an operation corresponding to the received query.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other.

Although the above-mentioned embodiment has exemplarily disclosed that the RVR DBMS of the present invention is used in a HDD, the present invention can be applied to a variety of storage mediums used as a substitute of a HDD.

For example, the present invention can also be applied to either a solid state drive (SSD) (solid state disk) that uses a flash memory as a substitute of a HDD, or a Dynamic Random Access Memory (DRAM). In this case, the concept of the RVR file is identical to that of the RAT file as described above, and SSD and DRAM must be interpreted as a substitute of a HDD.

The present invention relates to a method for creating/storing a file that facilitates a search operation, and a data search method using the same.

In recent times, a task for decoding human genome sequences of 1000 people is being conducted by United States NIH (http://www.1000genomes.org/). Only the amount of all data is about 3 terabytes, and it is impossible for the standard DBMS to process data of about 3 terabytes.

In the Republic of Korea, through the Korean Association Resource (KARE)—I project of Korea Centers for Disease Control and Prevention (KCDC) in 2007, the size of single dielectric data is about 500 Gigabytes. In KARE-II in 2008, similar data is further created by 2 Terabytes. In addition, it is impossible for the standard DBMS to create a database (DB) related to clinical epidemiology function information.

Therefore, when the present invention is applied to the task for storing/searching the latest data that is being developed to large capacity data, the present invention has greater effects in economic efficiency and research execution speed.

For example, theoretically, a similar (or homologous) matrix of (100 K bytes×100 K bytes) data records is created. In order to perform exhaustive clustering of data using this matrix, the (100 K bytes×100 K bytes) matrix must be normally loaded in a DRAM. In this case, if the C/C++ program uses precise integer variable (double), a DRAM of 8 Gigabytes (TB) is needed.

Therefore, the RVR-RAT scheme that uses a HDD is absolutely required to research such large-volume clustering.

Although the RVR DBMS according to the present invention can be used as a DBMS having various purposes, the current RVR DBMS version can be most efficiently used as a method for analyzing/managing large-volume bulk data for scientific technology. By means of some additional formats (minimum formatting task), the RVR DBMS can be directly connected to a data process and an analysis module of a DBMS. In addition, according to the present invention, several files can be quickly DBMS-processed in the same manner as in each user's Web 2.0 personal computer (PC) acting as a server. Cloud computing means a service that enables many users to use the analysis/calculation devices centralized in one place over the Internet. Such cloud computing is implemented by the present invention, such that a plurality of users can perform rapid calculation. The RVR DBMS can obtain the best application result from the cloud computing. If highly integrated indexing of all data is performed, data can be quickly distributed. Parallel distribution calculation of such distributed data can be quickly processed using a large number of PC clusters indicating the best advantage of the cloud computing technology.

As apparent from the above description, the file creating method for searching for single data and a method for searching for a single data file according to the embodiments of the present invention have the following effects.

In accordance with Rack of Virtual RAM (RVR) serving as a binary file for use in the present invention, addresses of all data records on a hard disk are recorded in an RAT file. Therefore, a user randomly accesses RVR file record information using not only programming languages (Perl, Python, Fortran, C/C++, JAVA, etc.) but also address information stored in the RAT file, formats the accessed resultant information using such programming languages, and outputs the formatted result. Therefore, the embodiments of the present invention can create a database (DB) for large irregular data and can also analyze data.

In addition, the present invention can implement random access using a relatively cheap hard disk without the need for large amounts of DRAM, resulting in economic efficiency.

With the development biotechnology, more than 2000 whole genome sequences ranging from microorganisms to animals and plants have been decoded and a single human genome consumes about 3 gigabytes.

In the meantime, an RVR database management system (DBMS) according to the present invention performs DBMS using data records of data files and their addresses, whereas the conventional standard DBMS constructs a regular data table, inputs data to the table, and applies a DBMS to the input table. In addition, the RVR DBMS according to the present invention constructs a plurality of tables in the same manner as in the standard DBMS, and systemically applies a DBMS to the relationship between inter- or intra-tables. Compared to the above-mentioned standard scheme, the RVR DBMS according to the present invention has advantages in that it constructs RVR-RATs for data records having different formats in different files and performs DBMS for the inter- or intra- files.

In the meantime, the RVR DBMS according to the present invention has the following advantages as compared to the conventional standard DBMSs (e.g., Main Memory based DBMS (MMDBMS), Disk resident DBMS (DRDBMS), and Hybrid DBMS (HDBMS)). There are differences among MMDBMS, DRDBMS and HDBMS. In more detail, MMDBMS enables a table present in a memory to be filled with data, DRDBMS enables a table present in a hard disk to be filled with data, and HDBMS stores data in a memory for rapid calculation and stably stores data in a disc. DRDBMS is preferable when dealing with large amounts of data, although response time is slow. However, MMDBMS is better suited to small amounts of data. The above-mentioned two advantages of DRDBMS and MMDBMS are all present in HDBMS.

Compared to the standard DBMS, the RVR DBMS scheme has the following characteristics (1), (2), (3), (4) and (5).

(1) The RVR DBMS scheme uses only hard disk highly integrated index addresses of a data file composed of a specific format stored in a hard disk, such that the RVR DBMS scheme is identical to the DRDBMS scheme. (2) The RVR DBMS scheme is similar to MMDBMS and has a rapid interaction speed. (3) Specifically, the RVR DBMS scheme can be applied even to bulk data for science and technologies. In addition, DBMS and analysis processes can also be easily applied to irregular data such as a large number of genome sequences incapable of being processed using the standard DBMS. (4) The RVR DBMS scheme is used as DBMS for data files, such that it can perform statistics and analysis calculation of data.

Therefore, the RVR DBMS scheme can be utilized in a system for analyzing interaction data for use in science and technology. (5) In addition, the RVR DBMS scheme performs highly integrated indexing of all files contained in a hard disk and manages the highly integrated result, such that it can easily distribute data. Such capability for easier data distribution of the RVR DBMS scheme can be more efficiently applied to cloud computing capable of easily performing distributed calculation.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A system for managing a database (DB) to search for a data file, the system comprising:

a processor;

a database (DB) for storing a Records Virtual Rack (RVR) file created by discriminating a single input irregular data file using a predetermined divisional unit, and a record allocation table (RAT) file created by detecting a record position for each divisional unit of the RVR file;

a Records Virtual Rack (RVR) controller for detecting a record position of searched information from the RAT file in association with input searched information, detecting a physical storage position contained in a storage medium of data corresponding to the searched information from the record position, searching for data of the physical position, and reading the searched data; and an analysis module for analyzing a result read by the RVR controller, wherein the divisional unit is any one of pagen, page, fastan, fasta, line, image, audio and video, and wherein the searched information is an order of each divisional unit.

2. The system according to claim 1, wherein the record position is the size of data accumulated in the single data extended up to a specific position where corresponding data is recorded.

3. The system according to claim 1, wherein the record position is a number of a hard disk cluster in which data of a corresponding part is recorded.

4. The system according to claim 1, wherein the storage medium is a semiconductor-type storage medium.

5. A system for managing a database (DB) to search for a data file, the system comprising:
- a processor;
- a database (DB) for storing a Records Virtual Rack (RVR) file created by discriminating a single input data file using a regular divisional unit based on a row and column, and a record allocation table (RAT) file created by detecting a record position for each divisional unit of the RVR file;
- a Records Virtual Rack (RVR) controller for detecting a record position of searched information from the RAT file in association with input searched information, detecting a physical storage position contained in a storage medium of data corresponding to the searched information from the record position, searching for data of the physical position, and reading the searched data; and
- an analysis module for analyzing a result read by the RVR controller, wherein the divisional unit of the regular data is any one of seq, int, float, string, csv, r, xml and smtx.

6. The system according to claim 5, wherein the searched information is a row number or a column number of corresponding data from among the regular data.

7. The system according to claim 5, wherein the record position is the size of data accumulated in the single data extended up to a specific position where corresponding data is recorded.

8. The system according to claim 5, wherein the detecting of the storage position includes:
calculating a cluster position from the record position using a size of data of each divisional unit, reading a physical storage position of the cluster position from a file allocation table (FAT), and detecting the read physical storage position of the cluster position.

9. The system according to claim 5, wherein the record position is a number of a hard disk cluster in which data of a corresponding part is recorded.

10. The system according to claim 2, wherein the record position is a number of a hard disk cluster in which data of a corresponding part is recorded.

11. The system according to claim 2, wherein the storage medium is a semiconductor-type storage medium.

12. The system according to claim 6, wherein the record position is a number of a hard disk cluster in which data of a corresponding part is recorded.

* * * * *